July 12, 1927.

A. O. ABBOTT, JR 1,635,240

APPARATUS FOR MANUFACTURING TIRES

Filed April 25, 1924 2 Sheets-Sheet 1

INVENTOR
ADRIAN O. ABBOTT, JR.
BY
HIS ATTORNEY

July 12, 1927.

A. O. ABBOTT, JR 1,635,240

APPARATUS FOR MANUFACTURING TIRES

Filed April 25, 1924   2 Sheets-Sheet 2

INVENTOR
ADRIAN O. ABBOTT, JR.
BY
HIS ATTORNEY

Patented July 12, 1927.

1,635,240

UNITED STATES PATENT OFFICE.

ADRIAN O. ABBOTT, JR., OF DETROIT, MICHIGAN, ASSIGNOR TO MORGAN & WRIGHT, OF DETROIT, MICHIGAN, A CORPORATION OF MICHIGAN.

APPARATUS FOR MANUFACTURING TIRES.

Application filed April 25, 1924. Serial No. 708,838.

This invention relates generally to the manufacture of tires, and more particularly, to an apparatus for shaping a green band or carcass into approximately tire form preliminary to its vulcanization.

It has been found desirable for many reasons to manufacture tires by a so-called "pulley-band" process, in which the constituent parts, rubber composition, and bead members, are assembled in juxtaposition on a building drum whose surface is flat in a transverse direction and preferably cylindrical. Such tire bands after building may be, and have been, variously shaped. In my prior application Serial No. 656,382, filed August 8th, 1923, since become Patent No. 1,507,563, granted September 9, 1924, is disclosed an apparatus for utilizing a vacuum, or rather partial vacuum, to effect their shaping. This invention aims to provide a new and improved type of such vacuous shaping apparatus, and in particular, to simplify and speed up the process of manufacturing tires therewith.

With the illustrated embodiments in mind and without intention to limit more than is required by the prior art, the invention, briefly stated, consists in providing extensions or skirts on the side of the vacuum chamber, or chest of any suitable size and shape, which extension or skirts are adapted to maintain a sealing engagement with the edges or beads of the band as it is progressively drawn into the vacuum chamber by exhaust of air therefrom.

Embodiments of the invention are illustrated in the accompanying drawings, in which:—

Figure 14:
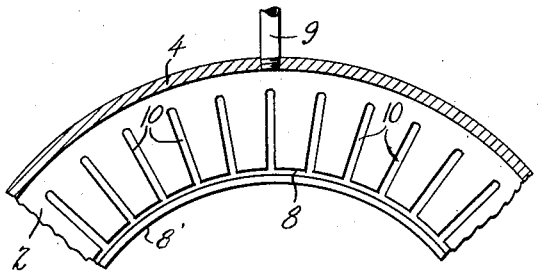

And Figure 14 is a face view looking at a side wall or plate of the chamber, showing the desirable grooved construction thereof.

Figure 1:
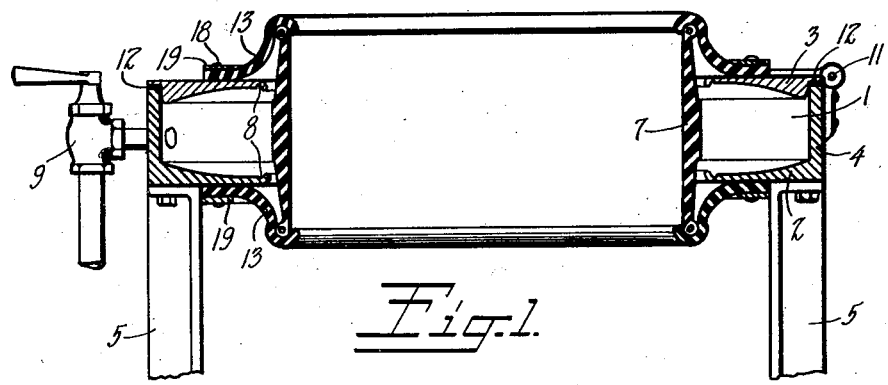
Figure 1 is a diagrammatic cross-section of one form of the invention.
Figure 2:
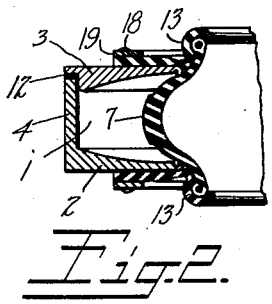
Figures 2 and 3 are fragmentary cross-sections of the same at different stages in the process of shaping.
Figure 3:
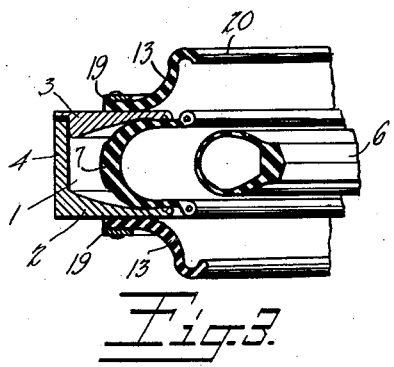
Figure 4:
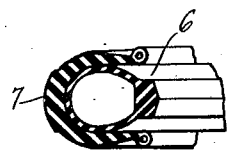
Figure 4 is a cross-section of a completely shaped tire with a vulcanizing bag in position thereon after removal from the shaping apparatus.
Figure 5:
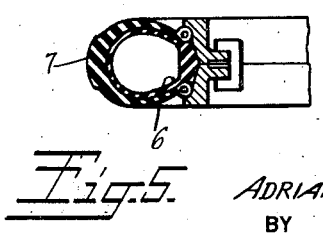
Figure 5 is a cross-section of the same tire mounted on bead rings, ready for introduction into a vulcanizing mold.
Figure 9:
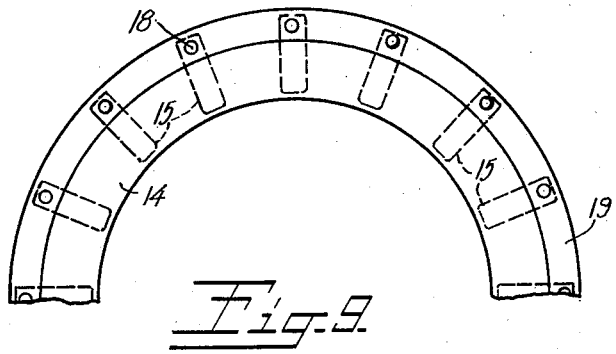
Figure 9 is a plan view of part of the form of extension or skirt shown in Figures 6, 7 and 8.

Referring to Figures 1 to 5 of the drawings, the apparatus is shown comprising a vacuum chamber, indicated generally by the numeral 1, consisting of side plates 2 and 3 and an outer wall 4, the inner periphery of the chamber being open to the atmosphere. The vacuum chamber may be supported in any convenient plane and by any suitable means, preferably horizontally on legs 5. The proportions and shape of the vacuum chamber may, of course, be varied, but it is desirable to make the outer wall 4 of a diameter somewhat larger than the tread portion of the casing in order to permit of subsequently positioning therein a curing or air bag 6, see Figure 4, without buckles or wrinkles. The inner edges of the side walls or plates 2 and 3 are preferably made slightly greater in diameter than the beads of the band or green casing 7 so that the latter may be introduced with ease and facility. The width between the side walls 2 and 3 is preferably made about as shown so as to allow the air bag 6 to be introduced readily, the edges of the casing not coming into contact with the inner edges of the plates 2 and 3 until the tire has been drawn nearly to shape. Generally, the chamber may be described as U-shaped in cross-section and of a size adapted to receive a substantially shaped casing. To hold the sides of the pulley-band and the bead portions thereof wide apart and facilitate the introduction of an air bag, about as shown in Figure 3 of the drawings, as well as to apply the vacuum to the best advantage, it is desirable to provide an annular groove 8 (or a series of notches in annular formation) adjacent the inner extremities of the side plates 2 and 3.

These annular grooves 8 may be maintained in communication with the evacuating means, indicated in the drawings by a valve-controlled line 9 (which, it is to be understood, may be in communication with any suitable form of evacuating apparatus), by a series of channels or ducts 10, see Figure 14, or by tubes or other suitable expedients. The ducts or tubes extend to a point beyond the zone of engagement of the casing with the fixed vacuum chamber 1. One of the side walls is preferably removably mounted in place, as by hinging it to the outer wall 4, as indicated at 11. A gasket 12 of rubber, or other suitable material, is provided to make the joint more or less air-tight.

The foregoing construction is much the same as that disclosed in the aforesaid prior application, to which reference may be made for further details.

Figure 10:
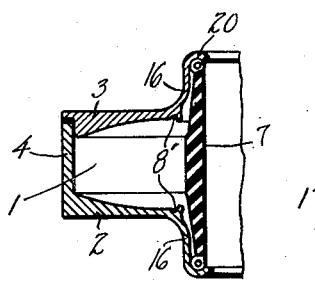
Figures 10, 11 and 12, are cross-sections of a modification in which the extensions or skirts are rigid, the different figures showing the successive positions assumed by a casing being shaped.
Figure 11:
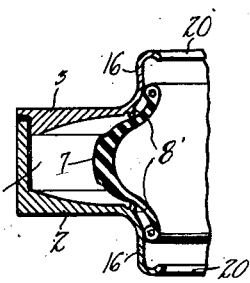
Figure 12:
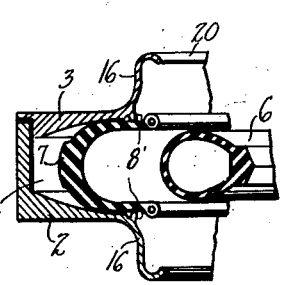
Figure 13:
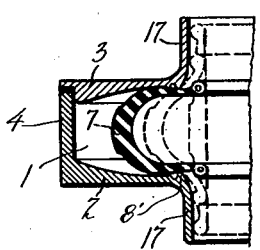
Figure 13 shows still another modified form of extension or skirt.

According to the present invention, the vacuum chamber 1 is provided with extensions or skirts which may be made of flexible, preferably elastic, material, such as rubber, as indicated at 13 in Figures 1, 2 and 3 of the drawings, or of rubberized fabric 14 enclosing, or reinforced by spring metal strips 15, as indicated in Figures 6 to 9 of the drawings, or of rigid material and integral with the side plates 2 and 3, as indicated at 16 in Figures 10, 11 and 12, and at 17 in Figure 13 of the drawings.

The extensions or skirts 13 and 14 may be secured substantially air-tightly to the outer surfaces of the side plates 2 and 3, in any suitable and convenient manner, as by screws 18 passing through washers or protecting plates 19. If of rigid material as indicated at 16 and 17 in Figures 10 to 13 of the drawings, the extensions or skirts are preferably made integral with the side plates 2 and 3, and with or without surved extremities 20 for receiving the beaded margins of the casing. Such rigid extensions or skirts are preferably made of a diameter on their inner surfaces approximately equal to the outside diameter of the toes or beaded margins of the band 7 in its normal or built condition.

Figure 6:
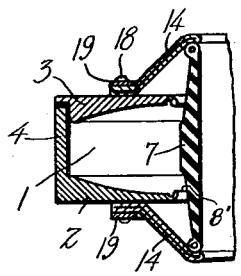
Figures 6, 7 and 8, are cross-sections of a vacuum chamber, showing another form of extension or skirt therefor.
Figure 7:
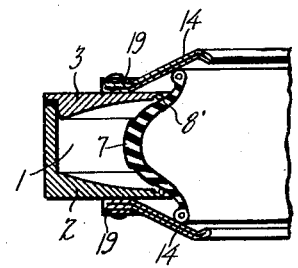
Figure 8:
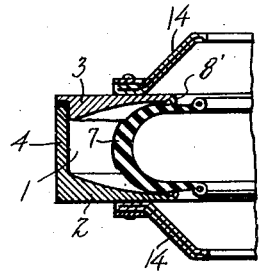

In operation, the casing 7 is introduced into position, as shown in Figures 1, 6 and 10, this being readily accomplished owing to the more or less pliable nature of the band. Air is then exhausted through the valve-controlled line 9, whereupon the casing 7 is drawn outwardly, as shown in the various figures of the drawings. If the extensions or skirts are of flexible or elastic material, they are drawn firmly against the tire and moved downwardly with its beads, bending or buckling intermediately more and more, as shown in Figure 2 of the drawings, until the casing is sealed against the inner edges or walls of the side plates 2 and 3. At or about this time, the grip of the flexible or elastic extensions is broken and they return to their normal positions, as shown in Figure 3 of the drawings.

If the extensions are of fabric reinforced with spring metal strips as shown in Figures 6 to 9 of the drawings, the action is very similar, although in this form of construction the flexible extensions swing downwardly rather than, or more than, they cave inwardly, as previously mentioned.

When the extensions or skirts are made of rigid material, as in Figures 10 to 13 of the drawings, the seal is maintained where the casing engages the more or less cylindrical inner surface of the rigid extensions, by reason of evacuation of air from the interior of the chamber 1, the beads of the casing being of about the same diameter.

In all forms of the invention it will be noticed that there is a successive sealing of the beaded portions of the casing. At the commencement of the shaping operation the beaded portions are sealed against the lateral extensions 13, 14, 16 and 17. Nearing the end and at the end of the shaping operation the beaded portions are sealed against the inner edges of the side walls 2 and 3 of the vacuum chamber 1. There are thus in all forms of the apparatus both primary and secondary sealing members with which the beaded portions of the casing are successively engaged, the primary sealing members being constituted by the parts indicated on the drawings by the numerals 13, 14, 16 and 17 and the secondary sealing members being indicated by the numeral 8'. The primary sealing members maintain a sealing engagement with the edge portions of the flat built casing throughout the first part of the shaping operation and then become ineffective, on and after which time the secondary sealing members 8' maintain the seal. And hence there are in the apparatus of the present invention means for successively engaging and sealing the beaded portions of the casing during its shaping to approximate tire form.

With the apparatus of the present invention, the operation of shaping the tire may be performed with great rapidity, practically instantaneously. The operator does not have to stand idle waiting for movement to a non-obstructing position of such auxiliary parts as are disclosed in the aforesaid prior application. In other words, tires may be manufactured with the apparatus of the present invention as fast as the operator can work. These and other advantages will be apparent to those skilled in the art.

The claims of this application have been limited to the type of apparatus in which the primary sealing members extending or arranged laterally of the vacuum chamber are of such length that they make sealing engagement at the commencement of a shaping operation with the beaded margins of the casing rather than in form the beaded margins of the casing, as in my subsequent application Serial No. 125,932, filed July 30, 1926. Broad claims covering the apparatus illustrated in this application as well as that illustrated in said subsequent application Serial No. 125,932, have been inserted in the later application and this application limited to the species of the invention illustrated or its equivalents.

Of course, various changes and modifications may be made in the details of construction of the apparatus, the specific embodiments herein described being merely illustrative. The invention is not intended to be limited, excepting as hereinafter pointed out in the appended claims to which reference should be made for a full and complete understanding of the scope of the invention.

Having thus described my invention, what I claim and desire to protect by Letters Patent is:—

1. A tire shaping apparatus comprising a non-collapsible hollow annular chamber having at its open inner periphery primary and secondary sealing members adapted respectively to initially and finally engage the beaded portions of a casing of a pulley band during its shaping treatment, and means for evacuating said chamber, the primary sealing members being airtightly secured to the chamber and extending laterally from opposite sides thereof sufficiently to make operative sealing engagement with the beaded margins of a casing at the commencement of a shaping treatment thereof.

2. A tire shaping apparatus comprising a non-collapsible hollow annular chamber having at its open inner periphery primary and secondary sealing members adapted respectively to initially and finally engage the beaded portions of a casing of a pulley band during its shaping treatment, and means for evacuating said chamber, the primary sealing members extending laterally from opposite sides of the chamber and their remote margins being located a distance apart at least approximately equal to the width of a casing before shaping treatment.

3. A tire shaping apparatus comprising a non-collapsible hollow annular chamber having at its open inner periphery primary and secondary sealing members adapted respectively to initially and finally engage the beaded portions of a casing of a pulley band during its shaping treatment, and means for evacuating said chamber, the primary sealing members being flexible and extending laterally from opposite sides of the chamber sufficiently to make operative sealing engagement with the beaded margins of a casing at the commencement of a shaping treatment thereof.

4. A tire shaping apparatus comprising a non-collapsible hollow annular chamber having at its open inner periphery primary and secondary sealing members adapted respectively to initially and finally engage the beaded portions of a casing of a pulley band during its shaping treatment, and means for evacuating said chamber, the primary sealing members being collapsible and extending laterally from opposite sides of the chamber, the remote margins of said primary sealing members being normally located a distance apart at least approximately equal to the width of a casing before shaping treatment.

5. A tire shaping apparatus comprising a non-collapsible hollow annular chamber, and means for evacuating the annular chamber, said chamber having at its open inner periphery secondary sealing members, and primary sealing members secured airtightly to said chamber and extending laterally from opposite sides thereof, the distance between the remote margins of said primary sealing members being substantially greater than the distance between the secondary sealing members and approximating the width of the casing before shaping treatment.

Signed at Detroit, county of Wayne, and State of Michigan, this 19th day of April, 1924.

ADRIAN O. ABBOTT, Jr.